(12) United States Patent
Eberle et al.

(10) Patent No.: US 9,162,168 B2
(45) Date of Patent: Oct. 20, 2015

(54) FILTER DEVICE AND FILTER ELEMENT PROVIDED THEREFOR

(75) Inventors: Richard Eberle, Ormesheim (DE); Micha Kreibig, Rehlingen-Siersburg (DE); Markus Dewes, Oberthal (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 412 days.

(21) Appl. No.: 13/261,419

(22) PCT Filed: Mar. 2, 2011

(86) PCT No.: PCT/EP2011/001014
§ 371 (c)(1),
(2), (4) Date: Oct. 17, 2012

(87) PCT Pub. No.: WO2011/107265
PCT Pub. Date: Sep. 9, 2011

(65) Prior Publication Data
US 2013/0048552 A1 Feb. 28, 2013

(30) Foreign Application Priority Data
Mar. 4, 2010 (DE) .......................... 10 2010 010 304

(51) Int. Cl.
*F02M 37/22* (2006.01)
*B01D 29/11* (2006.01)
*B01D 29/58* (2006.01)
(Continued)

(52) U.S. Cl.
CPC .............. *B01D 35/16* (2013.01); *B01D 35/153* (2013.01); *B01D 36/003* (2013.01); *B01D 29/117* (2013.01); *B01D 29/58* (2013.01); *B01D 2201/295* (2013.01); *B01D 2201/305* (2013.01); *B01D 2201/34* (2013.01); *B01D 2201/4007* (2013.01); *B01D 2201/4084* (2013.01); *F02M 37/221* (2013.01)

(58) Field of Classification Search
None
See application file for complete search history.

(56) References Cited

U.S. PATENT DOCUMENTS 2,864,505 A 12/1958 Kasten
3,165,470 A 1/1965 Giesse et al.
(Continued)

FOREIGN PATENT DOCUMENTS

DE 100 64 482 A1 7/2002
DE 10 2008 020 233 A1 10/2009

*Primary Examiner* — Benjamin Kurtz
(74) *Attorney, Agent, or Firm* — Roylance, Abrams, Berdo & Goodman LLP

(57) ABSTRACT

A filter device, in particular for fluids polluted with admixtures of water, such as diesel oil, includes a filter housing (1) having a fluid inlet (43), a fluid outlet (44) and a filter element (9). During the filtering process, the fluid can flow through the filter medium (11) of the filter element from the unfiltered side (14) to the filtered side (13) of the filter medium and into its inner filter cavity (17). On at least one side of the filter medium (11), a water-separating system (23) has a separating region (25) for separated water. The water separating system is connected via at least one water opening (35) that is open toward the separating region (25) to a water collecting chamber (45). The filter element (9) has a passage (29) forming a fluid connection to the inner filter cavity (17) and can be connected to an element receptacle (47) of the filter housing (1). A fluid-conveying system (41) forms fluid paths separated from each other. The first fluid path (59/69) leads from the fluid inlet (43) of the housing (1) to the unfiltered side (14) of the filter element (9). The second fluid path (57) connects the respective water opening (35) to the water collecting chamber (45).

17 Claims, 2 Drawing Sheets

(51) Int. Cl.
   *B01D 35/16*   (2006.01)
   *B01D 35/153*  (2006.01)
   *B01D 36/00*   (2006.01)

(56) References Cited

U.S. PATENT DOCUMENTS

| | | | | |
|---|---|---|---|---|
| 3,262,572 A | * | 7/1966 | Cook | 210/307 |
| 3,508,658 A | * | 4/1970 | McVay | 210/114 |
| 4,372,847 A | * | 2/1983 | Lewis | 210/86 |
| 5,017,285 A | * | 5/1991 | Janik et al. | 210/232 |
| 2002/0117441 A1 | | 8/2002 | Smith et al. | |
| 2010/0294712 A1 | * | 11/2010 | Abdalla et al. | 210/487 |
| 2011/0186501 A1 | * | 8/2011 | Braunheim et al. | 210/232 |

* cited by examiner

FILTER DEVICE AND FILTER ELEMENT PROVIDED THEREFOR

FIELD OF THE INVENTION

The invention relates to a filter device that is intended in particular for fluids, such as diesel oil, contaminated with water impurities, and that comprises a filter housing having a fluid inlet, a fluid outlet and at least one filter element accommodated therein. The filter medium of the filter element surrounds an inner filter cavity in the filtration process. The fluid flows from the unfiltered side to the filtered side. On at least one side of the filter medium, a water separation device has a separating region for separated water connected to a water collecting space via at least one water passage that is open to the separating region. The filter element has a passage forming a fluid connection to the inner filter cavity and is securable on an element retainer of the filter housing. Furthermore, the invention relates to a filter element intended for use in such a filter device.

BACKGROUND OF THE INVENTION

Filter devices of the aforementioned type are known from the prior art. Such filter devices are typically used in fuel systems for internal combustion engines to protect sensitive components, in particular the injection systems, against degradation due to the water content entrained in the fuel. In this case, separation of the water content entrained in the fuel can be effected by a coagulation process during which water droplets are formed on the filter medium. These water droplets can flow out of the separation space, formed in the filter element, to the water collecting space.

To ensure the operational reliability of the systems located downstream of the filter, avoiding system contamination by dirt is critical in the processes of changing the filter element as necessary over the service life. The fluid connection between the filtered side of the filter element and the fluid outlet of the housing is interrupted when the end cap of the used filter element is decoupled from the element retainer. Dirt that has accumulated on the used filter element must be prevented from falling off. A separate reliable conveyance of the fluid by the water that forms is also desirable to increase operational reliability.

SUMMARY OF THE INVENTION

An object of the invention is to provide an improved filter device of the type under consideration, whose construction ensures a maximum of operational reliability and reduces the risk of contamination during changing processes, in particular at the fluid outlet of the housing.

This object is basically achieved according to the invention by a filter device having a fluid-conducting device in which fluid paths separated from one another formed, with a first fluid path leading from the fluid inlet of the housing to the unfiltered side of the filter element and a second fluid path connecting the water passage to the water collecting space. In this way, a reliable separation of the fluid paths under consideration via the fluid-conducting device is created. Even when a used filter element is removed and replaced by a new element, no contamination of the system occurs by dirt accumulated on the used filter element falling off in the direction of the filtered side. Rather, this dirt remains on the unfiltered side. An inadvertent introduction of water either to the filtered side or to the unfiltered side is not possible either.

Compared to known filter devices of this type, in which in the filtration process flow takes place through the filter medium of the filter element from its outer unfiltered side to the inner filter cavity forming the filtered side, in one advantageous embodiment of the invention, the fluid-conducting device induces a kind of flow reversal. Flow then takes place through the filter element preferably from the inner filter cavity to the outside. This reverse flow substantially improves the situation during the process of changing the filter. When flow takes place through the filter element from the inside to the outside, the unfiltered side is located in the inner filter cavity. Dirt particles, accumulated on the unfiltered side that might fall off when the filter element is removed, remain in the separated region of the unfiltered-side fluid path. Also, the fluid outlet that discharges on the outside of the filter medium that forms the filtered side is located outside the "endangered" region. The risk of fouling of the system downstream of the fluid outlet is thus effectively prevented.

In an especially advantageous manner, the unfiltered side is formed by the inner filter cavity of the filter element, and the water separation device with its water passage that is open toward the separating region are components of the filter element.

The water collecting space is preferably arranged to adjoin the filter housing such that at the lowest point of the filter housing, with the element retainer of the filter housing being located above the water collecting space.

In exemplary embodiments, the filter element on its lower end has an end cap with the passage leading into the filter cavity and with at least one water passage. The fluid-conducting device can then be brought into a sealed fluid connection to the end cap. Mechanically, this structure results in a simple structure.

Especially advantageously, the fluid-conducting device for forming the separate fluid paths has an adapter part designed as a connecting element via which the end cap of the filter element can be secured on the element retainer. The end cap thus can be designed as a disposable component to be changed together with the filter element in a simple, economically producible construction. The fluid-conducting device forming the separate fluid paths can form its own component separate from the end cap in the form of the adapter part.

In advantageous exemplary embodiments, the preferably circular end cap on its peripheral edge has an annular body forming inner annular jacket surfaces separated from one another and extending in the axial direction. One of the jacket surfaces adjoins a hydrophobic screen that surrounds the outside of the filter medium at a radial distance forming the separating region. Another of the jacket surfaces forms a sealing surface for the fluid-tight contact of a peripheral edge part of the adapter part.

With respect to the configuration of the end cap, preferably the end cap for formation of the passage has a pipe section extending from the end cap bottom forming the support for the filter medium and defining the main plane of the end cap. This pipe section extends axially upward into the filter cavity and axially downward for a sealed engagement with an inner pipe located in the adapter part and, as part of the fluid path, being fluid-connected to the fluid inlet of the housing.

In especially advantageous exemplary embodiments, the inner pipe of the adapter part is surrounded by a sleeve body that is open toward the water collecting space on the lower end facing away from the end cap and that surrounds the inner pipe at a distance by which a water channel is formed as part of the second fluid path.

Furthermore, the adapter part can advantageously be made such that the sleeve body of the adapter part on its end facing the end cap has a flat ring washer that is continuous without interruption up to its peripheral edge part and that can be moved into sealed contact with the assigned annular jacket surface of the end cap. In the operating position, the flat ring washer extends along the end cap bottom at a distance by which the water channel of the sleeve body is continued up to the respective water passage formed in the end cap bottom. The adapter part used as a fluid-conducting device, together with the underside of the end cap bottom, thus forms the part of the second fluid path via which the water collected in the separation space drains out, which part leads to the respective water passage.

The element retainer can advantageously have a pipe connector that forms the connection between a water collecting space and the main part of the housing accommodating the filter element. In the connector, the sleeve body of the adapter part can be accommodated to secure the pertinent filter element via its end cap that is in sealing connection to the adapter part in the housing.

For its function as a fluid-conducting device, the adapter part can advantageously be designed such that the sleeve body on its outside for contact with the inside of the pipe connector of the element retainer has two radially projecting annular parts arranged at an axial distance from one another. An annulus is then formed between the outside of the sleeve body and the inside of the pipe connector of the element retainer, with a feed channel leading to the fluid inlet of the housing as part of the first fluid path discharging into the annulus.

For this fluid path to extend from the inner pipe to the fluid inlet, a connecting channel branches off from the inner pipe of the adapter part, discharges into the annulus on the outside of the sleeve body and continues the first fluid path to the fluid inlet of the housing.

With respect to the sealing between the end cap of the filter element, adapter part and element retainer, O-rings can seal the annular parts of the sleeve body on the pipe connector of the element retainer, the pipe body of the end cap on the inner pipe of the adapter part, and the edge part of the ring washer of the adapter part on the annular jacket surface of the end cap.

The sealing of the outside of the sleeve body of the adapter part relative to the inside wall of the element retainer affords the additional advantage that the otherwise conventional sealing of the outer periphery of the end cap relative to the inside of the housing is eliminated. Instead, the sealing between the filtered side and the unfiltered side is affected with much smaller seal diameter. Reduced installation forces and thus a simplification result during the installation and removal of filter elements.

The subject matter of the invention is also a filter element intended for use in the filter device according to the invention.

Other objects, advantages and salient features of the present invention will become apparent from the following detailed description, which, taken in conjunction with the annexed drawings, discloses a preferred embodiment

BRIEF DESCRIPTION OF THE DRAWINGS

Referring to the drawings that form a part of this disclosure.

DETAILED DESCRIPTION OF THE DRAWINGS

Figure 1:
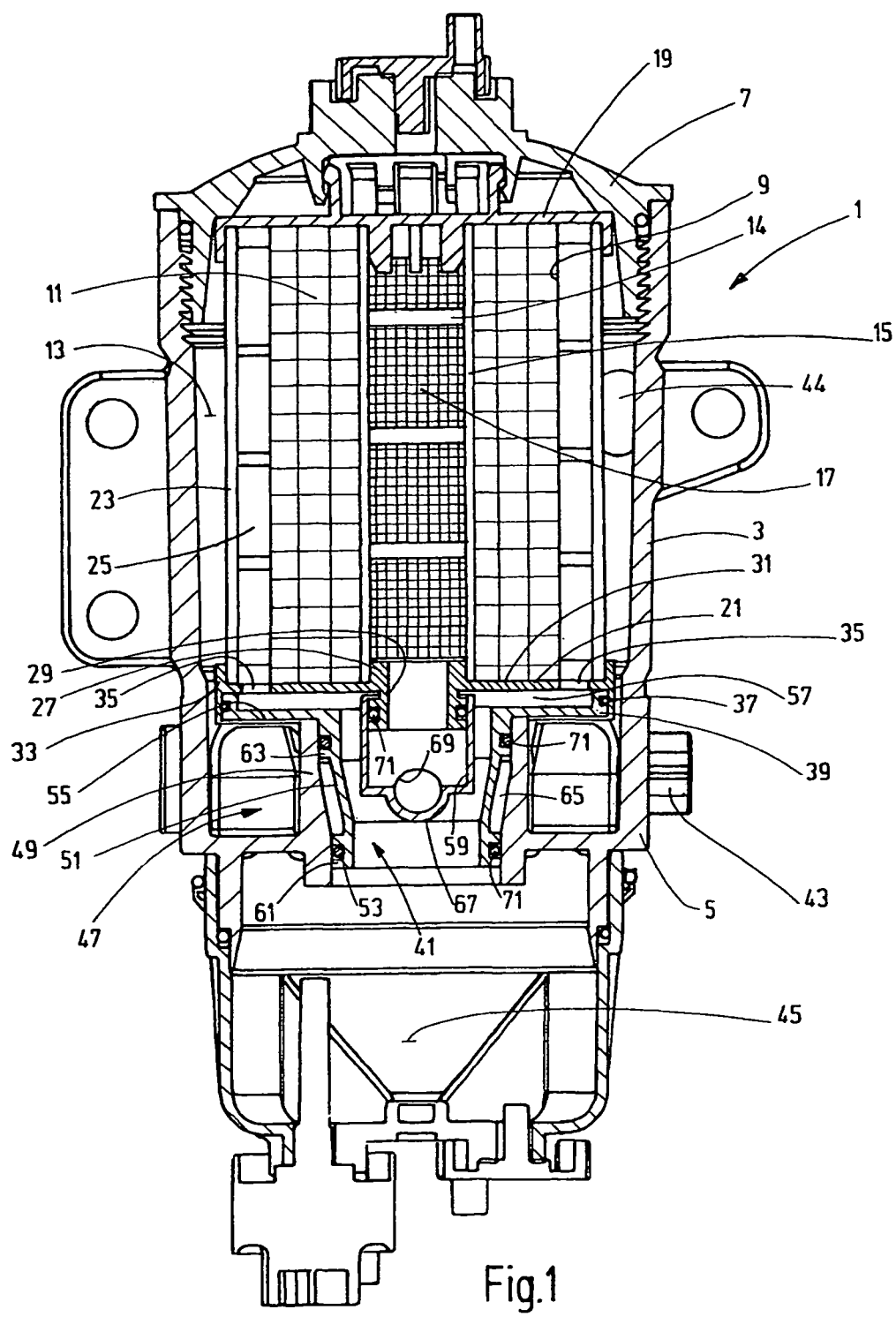
FIG. 1 is a side elevational view in section of a filter device according to an exemplary embodiment of the invention.
Figure 2:
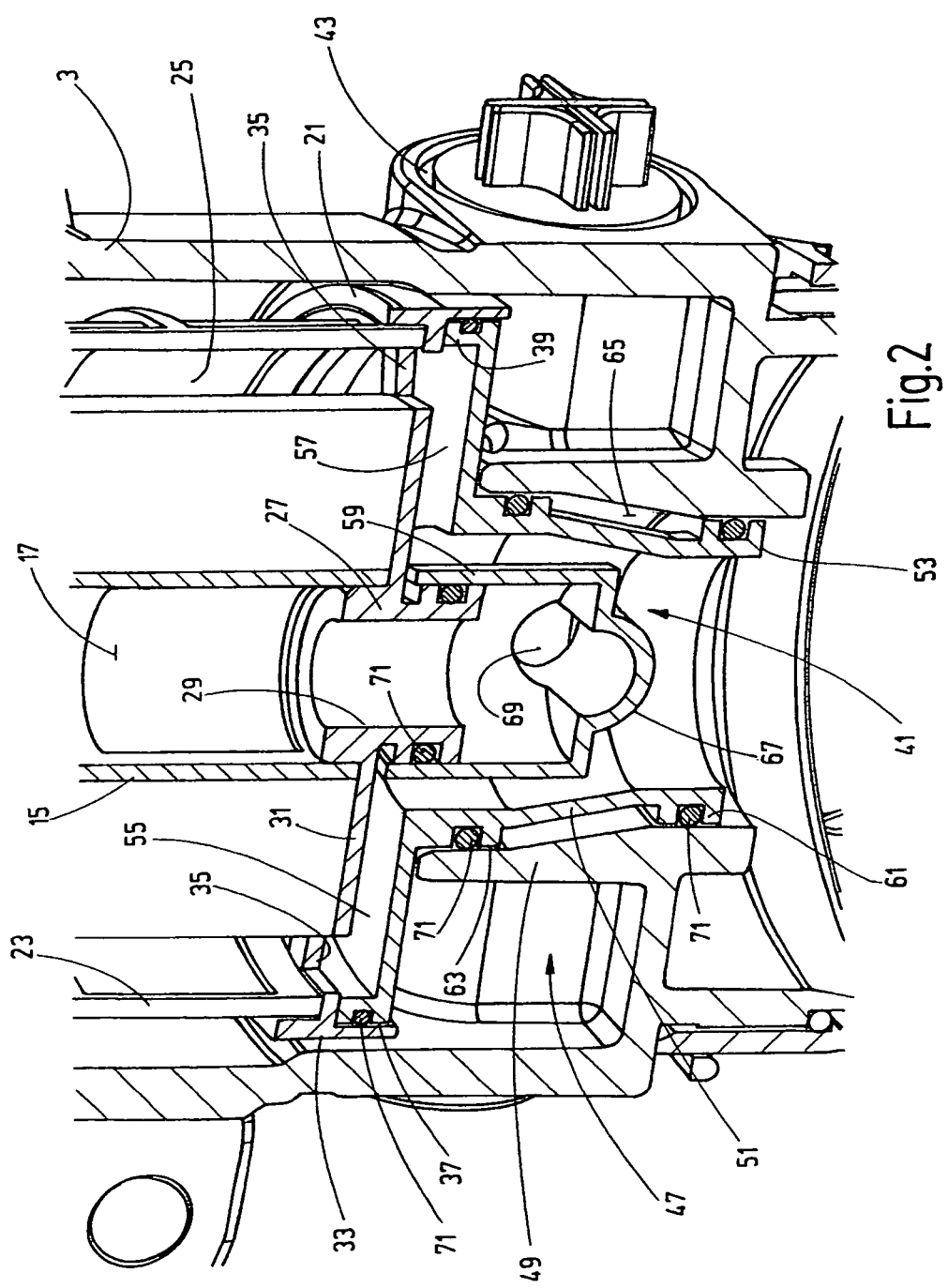
FIG. 2 is an enlarged, partial perspective view of only the region of the filter device of FIG. 1 that borders the fluid-conducting device.

The device has a filter housing 1 with a hollow cylindrical main part 3 and a bottom part 5 that adjoins the housing bottom side. On the upper end, a housing cover 7 that can be removed for installing and removing a filter element 9 is screwed to the main part 3. Between the outside of the filter element 9 held in the housing 1 and the inside wall of the housing 1, an intermediate space forms the filtered side 13 in the filtration process. A fluid outlet 44 leads from the filtered side 13 out of the housing 1 for the drainage of the cleaned fluid. The filter medium 11 of the filter element 9 is formed by a filter mat shaped into a hollow cylinder and surrounding the fluid-permeable support pipe 15 forming an inner filter cavity 17 that, in the filtration process, forms the unfiltered side 14 to which the fluid to be cleaned can be supplied. The fluid flows through the filter medium 11 from the inside to the outside in the filtration process.

The ends of the filter element have, in the conventional manner, end caps 19 and 21 that form enclosures for the filter medium 11 and the support pipe 15. The end caps 19, 21 moreover form an enclosure for a hydrophobic screen 23 in the form of an hollow cylinder that surrounds the outside of the filter medium 11 at a distance. A separating region 25 in the form of a separating space is then formed between the hydrophobic screen 23 and the filter medium 11. To effect water separation, as is conventional in these fuel filters, the filter medium 11 acts to coagulate the water entrained by the fuel so that water in droplet form precipitates out of the fluid and sinks down in the separation space 25 since the screen 23 is impermeable to coagulated water droplets.

The lower end cap 21 secures the filter element 9 in the operating position in the housing 1 and is designed such that it interacts with a fluid-conducting device for filtration operation. For this purpose, the end cap 21 has a pipe section 27 that forms a passage 29 for the inflow of fluid to the inner filter cavity 17. The pipe section 27 extends from the end cap bottom 31 that forms a flat support surface for the lower edge of the filter medium 11, both axially upward into the filter cavity 17 and downward axially from the end cap bottom 31. As an outer peripheral edge, the end cap bottom 31 has an annular body 33. Gaps in the end cap bottom 39 are aligned to the separating region 25 and form water passages 35 for the exit of water from the separation space 25. The annular body 33 of the end cap 21 is shaped such that above and below the end cap bottom 31, annular jacket surfaces 37 are formed. The first or upper annular jacket surface adjoins the hydrophobic screen 23. The second or lower annular jacket surface 37 forms a sealing surface for the interaction with a peripheral edge part 39 of an adapter part 41 used as the fluid-conducting device.

The adapter part 41, in its operation as a fluid-conducting device, forms fluid paths that are separated from one another. A first fluid path leads from the fluid inlet 43 of the housing 1 via the passage 29 to the filter cavity 17 forming the unfiltered side 14. The second fluid path leads via the water passages 35 out of the separating region 25 as far as the water collecting space 45 in the bottom part 5 of the housing. Instead of an independent adapter part 41, its connection geometry can also be an integral component of the lower end cap 21 of the filter element 9.

In this example, the element retainer 47, on which the filter element 9 can be secured via the adapter part 41 used as a connecting or intermediate element, has a pipe connector 49 forming the single connection between the main housing part 3 that holds the filter element 9 and the water collecting space 45. The adapter part 41 has a sleeve body 51 that can be accommodated in the pipe connector 49. On its lower end 53, sleeve body 51 is open to the water collecting space 45. On its top end, sleeve body 51 undergoes transition into a ring washer 55 that extends in a radial plane and that, on its peripheral edge, forms the edge part 39 projecting axially upward and sealed to the inner annular jacket surface 37 of the annular body 33 of the end cap 21. In this way, proceeding from the water passages 35, a water channel 57 is formed between the end cap bottom 31 and the washer 55 of the adapter part 41, which channel continues along the inside of the sleeve body 51 as far as the water collecting space 45 and forms the second fluid path.

For the formation of the first fluid path from the fluid inlet 43 of the housing 1 via the adapter part 41 and the passage 29 of the end cap 31 into the inner filter cavity 17, the adapter part 41 has an inner pipe 59 extending concentrically within the sleeve body 51 at a distance from its inside wall. A space then remains open for the water channel 55 on the outside of the inner pipe 59. The pipe section 27 with the passage 29 sealingly engages the inner pipe 59.

The sleeve body 51, in the vicinity of its lower end and in the vicinity of the upper ring washer 55, has radially projecting annular parts 61 and 63, respectively, on which sealing takes place relative to the inside wall of the pipe connector 49 of the element retainer 47. The radially projecting annular parts 61, 63 between the pipe connector 49 and the sleeve body 51 form an annulus 65, from which a feed channel (not visible in the drawings), leads to the fluid inlet 43 that forms the inlet part of the first fluid path. For the continuation of this fluid path via the inner pipe 49 of the adapter part 41 as far as the filter cavity 17 forming the unfiltered side 14, a connecting channel 69 branches off from the closed end 67 of the inner pipe 59 and leads into the annulus 65. The first fluid path then continues from the fluid inlet 43, the annulus 65, and the connecting channel 69 of the inner pipe 49 as far as to the passage 29 of the end cap 21. The inner pipe 59 is connected preferably integrally to the sleeve body 51 via the connecting channel 69 and/or via connecting bridges (not detailed).

As is apparent from the figures, the sealings of the annular parts 61, 63 of the sleeve body 51 take place on the pipe connector 49 of the element retainer 47. Sealings of the pipe section 27 of the end cap 21 take place on the inner pipe 59 of the adapter part 41. Sealings of the edge part 49 of the ring washer 55 of the adapter part 41 take place on the annular jacket surface 37 of the end cap 21. Each of these sealings is by O-rings 71. In the sealing formed in this way, seals for the outer periphery of the end cap 21 of the filter element 9 relative to the inside of the housing 1 are unnecessary.

The filter element 9 has the filter medium 11 surrounding the inner filter cavity 17 through which the fluid to be filtered flows for the filtration process. On the outer peripheral side of the filter medium 11 the water separation device 23 and the separating region 25 for separated water is located. The separating region 25 has at least one water passage 35. Passage 29 forms the fluid connection to the inner filter cavity 17 of the filter element 9. The water passage 35 is separated from the passage 29 within the filter element 9 by the adapter-shaped fluid-conducting device 41.

On the lower end of the filter element 9, the end cap 21 accommodates the filter medium 11 and has the passage 29 that leads into the inner filter cavity 17 and the respective water passage 35, with the end cap 21 being fluid-connected in a sealed manner to the fluid-conducting device 41. When the filter element 9 completed in this way is removed from the filter housing 1 after unscrewing the upper housing cover 7, for example, to replace a used filter element with a new element, the particulate dirt settled on the inside of the filter medium 11 as well as possible residues of unfiltered fluid remain on the unfiltered side 14 of the filtration assembly. Separated water that is still present in the separating region 25 travels via the respective passage site 35 further in the direction of the water collecting space 45 and does not inadvertently reach the unfiltered side 14 nor the filtered side 13.

The water collecting space 45 located on the bottom side of the filter housing 1 is surrounded by a collection housing that can be screwed onto the filter housing 1 from underneath. The collection housing is preferably of a transparent, cup-shaped plastic. As is especially apparent from FIG. 1, on the bottom side of the collection housing, at least one water removal device or drain, for example, in the form of a conventional drain screw is provided. When the water collecting space 45 in the collection housing is correspondingly filled, the water can be discharged in this way from the device via the respective drain screw. After the installation of the appropriate new filter element 9 and emptying of the collection housing tank at least at maximum fill level of the water collecting space 45, the filter device is then available again for further filtration operation.

While one embodiment has been chosen to illustrate the invention, it will be understood by those skilled in the art that various changes and modifications can be made therein without departing from the scope of the invention as defined in the appended claims.

What is claimed is:

1. A filter device, comprising:
  a filter housing having a fluid inlet, a fluid outlet, a water collecting space and an element retainer;
  at least one filter element in said filter housing, said filter element having a filter medium surrounding an inner filter cavity and having an unfiltered side and a filtered side, said filter element having an end cap with a passage forming a fluid connection to said inner cavity, said end cap being releasably securable on said element retainer;
  a water separation device with a separating region for separated water in said filter housing; and
  a fluid conducting device having first and second fluid paths therein separated from one another, said first fluid path connecting said fluid inlet to said unfiltered side of said filter element, said second fluid path connecting a water passage connected to said separating region to said water collecting space, said fluid connecting device including an adapter part providing a connecting part securing said filter element via said end cap thereof on said element retainer, said adapter part having an inner pipe extending concentrically within a sleeve body at a distance from an inside wall of said sleeve body providing a space between said inner pipe and said sleeve body forming an open water channel on an outside of said inner pipe to form part of said second path.

2. A filter device according to claim 1 wherein
  said unfiltered side is on an inner surface of said filter medium facing said inner filter cavity; and
  said filtered side is on an outer surface of said filter medium facing said separating region.

3. A filter device according to claim 2 wherein
  said water separation device and said water passage are components of said filter element.

4. A filter device according to claim 2 wherein
  said water collecting space is at a lowest point of and adjoins said filter housing; and
  said element retainer is located above said water collecting space.

5. A filter device according to claim 2 wherein
  said end cap receives said filter medium;
  said water passage is in said end cap; and
  said fluid conducting device has a sealed fluid connection to said end cap.

6. A filter device according to claim 2 wherein
said end cap comprises a circular peripheral edge and an annular body on said peripheral edge, said annular body having first and second inner annular jacket surfaces separated from one another and extending in an axial direction, said first inner annular jacket surface adjoining a hydrophobic screen surrounding said outer surface of said filter medium at a radial distance forming said separating region, said second inner annular jacket surface forming a sealing surface in fluid-tight contact with a peripheral edge part of said adapter part.

7. A filter device according to claim 6 wherein
said end cap comprises a pipe section forming said passage of said end cap and extending from an end cap bottom axially upwardly into said filter cavity and axially downwardly to sealingly engage said inner pipe located in said adapter part, said end cap bottom forming a support for said filter medium and defining a main plane of said end cap, said pipe section and said inner pipe forming a portion of said first fluid path.

8. A filter device according to claim 7 wherein
said sleeve body is open toward said water collecting space on a lower end thereof facing away from said end cap.

9. A filter device according to claim 6 wherein
said sleeve body comprises a flat ring washer on a sleeve body end facing said end cap, said flat ring washer being continuous without interruption to a peripheral edge part thereof in sealed contact with said second inner annular jacket surface of said end cap and extending along said end cap bottom at a distance therefrom forming a water channel portion of said second fluid path from said water passage that is in said end cap.

10. A filter device according to claim 9 wherein
said element retainer comprises a pipe connector connecting said water collecting space and a main part of said filter housing receiving said filter element, said sleeve body being received in said pipe connector to secure and seal said end cap to said adapter part.

11. A filter device according to claim 10 wherein
said sleeve body comprises first and second radially outwardly projecting annular parts arranged at an axial distance from one another on an outside surface of said sleeve body, said radially outwardly projecting annular parts contacting an inside surface of said pipe connector and defining an annulus between said outer surface of said sleeve body, said inside surface of said pipe connector and said first and second radially outwardly projecting annular parts; and
a feed channel connects said fluid inlet and said annulus forming a part of said first fluid path.

12. A filter device according to claim 11 wherein
a connecting channel connects said inner pipe of said adapter part and said annulus.

13. A filter device according to claim 11 wherein
O-rings extend and form seals between said radially outwardly projecting annular parts of said sleeve body and said inside surface of said pipe connector of said element retainer, between said pipe section of said end cap and said inner pipe of said adapter part, and between said edge part of said flat ring washer of said adapter part and said second annular jacket surface of said end cap.

14. A filter element for a filter device, comprising:
a filter medium surrounding an inner filter cavity, having an unfiltered side on an inner surface of said filter medium and having a filtered side on an outer surface of said filter medium;
a water separation device spaced radially outwardly on said outer surface of said filter medium;
a separating region between said water separation device and said filter medium;
at least one water passage extending from said separating region;
a fluid passage extending from said inner filter cavity of said filter medium and being separated from said water passage maintaining separation of flows in said fluid passage and said water passage;
an end cap on a lower end of said filter medium and contains said fluid passage and said water passage, said end cap being sealable to a fluid conducting device in a filter housing; and
a fluid conducting device coupled to said end cap and has first and second fluid paths therein separated from one another, said first fluid path connecting a fluid inlet to said unfiltered side of said filter element, said second fluid path connecting said water passage connected to said separating region to a water collecting space, said fluid connecting device including an adapter part providing a connecting part securing said end cap on said element retainer, said adapter part having an inner pipe extending concentrically within a sleeve body at a distance from an inside wall of said sleeve body providing a space between said inner pipe and said sleeve body forming an open water channel on an outside of said inner pipe to form part of said second path.

15. A filter element according to claim 14 wherein
said end cap comprises a connecting element connectable to the fluid-conducting device in the filter housing.

16. A filter element according to claim 15 wherein
said end cap comprises a circular peripheral edge and an annular body on said peripheral edge, said annular body having first and second inner annular jacket surfaces separated from one another and extending in an axial direction, said first inner annular jacket surface adjoining a hydrophobic screen surrounding said outer surface of said filter medium at a radial distance forming said separating region, said second inner annular jacket surface being sealable in fluid-tight contact with a peripheral edge part of an adapter part in the filter housing.

17. A filter element according to claim 16 wherein
said end cap comprises a pipe section forming said fluid passage of said end cap and extending from an end cap bottom axially upwardly into said filter cavity and axially downwardly to sealingly engage an inner pipe located in the adapter part, said end cap bottom forming a support for said filter medium and defining a main plane of said end cap.

* * * * *